3,219,521
**METHOD FOR CONTROLLING *PETROMYZON MARINUS***
Vernon C. Applegate and John H. Howell, Rogers City, Mich., assignors to the United States of America as represented by the Secretary of the Interior
No Drawing. Filed Apr. 11, 1957, Ser. No. 652,316
6 Claims. (Cl. 167—31)
(Granted under Title 35, U.S. Code (1952), sec. 266)

This case is a continuation-in-part of application Serial No. 574,931, filed March 29, 1956, now abandoned.

The invention herein described and claimed may be manufactured and used by or for the Government of the United States of America for governmental purposes without payment of royalties thereon or therefor.

This invention relates to the control of sea lampreys (*Petromyzon marinus*), and more particularly to the chemical treatment of the aquatic habitats in which the larval stage lives and grows during a period of approximately four to five years.

It is an object of our invention to provide a practicable means for protecting food and game fish in the Great Lakes by a rapid and substantial reduction in the adult sea lamprey population of these lakes. It is a further object of our invention to provide a simple and economic means for the destruction of sea lampreys in the larval stage without any seriously adverse effect upon food and game fish. These and other objects will be apparent from the following description and claims.

The sea lamprey is a marine species which hatches in fresh water, migrates to the ocean for its adult life, and then returns to fresh water to spawn. Spawning takes place in early spring, at which time sexually matured adult lampreys move upstream seeking clear running creeks with a gravel or sand bottom and a moderately strong current. Spawning begins when the stream temperature is over 50° F. and is usually completed within a few days, immediately prior to the death of the mating pair. Female lampreys deposit an average of over 60,000 eggs, of which about 1% will hatch within ten to twelve days. The newly hatched larvae drift downstream with the current until the flow becomes quite still and quiet, usually over the mud banks of the marshy regions in the lower stretches of the stream. Here the individual larva burrows into the muddy bottom where it spends from four to five years subsisting on microscopic organisms passing the mouth of its burrow. During this stage, the lamprey is blind and harmless.

After about four years, however, a striking metamorphosis occurs and the larva develops into a young sea lamprey, perhaps seven inches in length, equipped for its adult parasitic existence with a round sucker-like mouth lined with horny teeth, and a file-like tongue. A strong swimmer with excellent vision, the lamprey makes easy prey of fish much larger than itself. Once attached to the victim with its mouth, it is not easily dislodged and remains until satiated or the death of the host, usually a matter of a few hours. Feeding on a succession of victims, the lamprey grows rapidly to a length of twelve to twenty-four inches.

This phase lasts from twelve to twenty months during which a single adult lamprey will destroy or seriously injure over twenty pounds of fish.

Before 1921 the presence of these lampreys was known only in the St. Lawrence River and in Lake Ontario, but this part of the Great Lakes system is not a favorable environment and the lampreys have never been a problem. Since 1921, apparently through the Welland Canal, the sea lamprey has become established in Lake Erie and from thence has gradually extended its habitat to include Lake Huron and Lake Michigan where conditions are particularly favorable and it has multiplied prodigiously. More recently it has been found in significant numbers in Lake Superior. In this part of the Great Lakes system, at least, the lamprey had adjusted itself to spending its entire life cycle in fresh water, with its adult, or parasitic phase, being spent in one of the lakes instead of in the ocean.

At the present time, the presence of sea lampreys in the Great Lakes, more especially Lakes Huron, Michigan, and Superior, is a problem of great concern to commercial and sports fishermen in the United States and Canada. For example, the commercial catch of lake trout has declined in Lake Huron from approximately six million pounds in 1935 to about three hundred forty-four thousand pounds in 1953. In Lake Michigan, the commercial production of lake trout declined precipitously from a high of nearly seven million pounds in 1934 to a few hunrded pounds in 1953. With the virtual extinction of the preferred lake trout, other species, such as whitefish, suckers, and walleyes, fall prey to the lampreys.

Control of the lamprey in a large body of open water, such as one of the Great Lakes by known and available techniques is substantially impossible. However, means for combatting this pest may be effectively and economically applied during those parts of its life cycle spent in the smaller streams. Destruction of the adults during the spawning runs is a practicable procedure. This may be accomplished by electrical barriers which kill, or repel, the adults before reaching the spawning grounds, or even by mechanical barriers which delay or prevent access to the spawning grounds. The use of poisons in the waters below the spawning grounds, while effective, also destroys other fish.

Unfortunately such methods, regardless of adverse effects upon other species of aquatic life and other shortcomings, are seriously defective in view of the time lag before the results of such control become apparent. Larval lamprey already in the streams continue to grow and develop into the parasitic adults. Thus it may be as much as seven years before the lamprey population of Lake Huron or Lake Michigan shows any marked decrease after application of the control measures.

The life cycle of the lamprey can be most satisfactorily broken at the larval stage with the application of certain chemicals. The effects of such control become apparent in less than two years. However, as in the case of the adult lampreys, such method will be acceptable only if the chemical used is non-toxic, or relatively so, to desirable game and food fishes. In addition, the larvicidal agent should be substantially harmless to the various organisms which provide food for such fishes.

We have found that halogenated mononitrophenols and their alkali metal salts, especially those having from 1 to 3 halogens substituted in the ring, or a trihalogenomethyl radical attached to the ring, the halogens being fluorine, chlorine or bromine, are outstanding in regard to toxicity to sea lamprey larvae at dilutions which are substantially harmless to desirable aquatic life.

Our invention is calculated to attack and destroy lamprey during the larval stage while they are burrowed into the mud banks by establishing in the water immediately over such banks a concentration of the chemical which is lethal to the lamprey larvae. This toxic amount should be closely controlled. If the quantity of the chemical added to the water results in sustained concentration in excess of the indicated optimum upper limit, the additional amount serves no useful purpose, increases the cost of the operation and may prove harmful to desirable species such as game fish and food fish.

The following example is given to illustrate the invention:

EXAMPLE

The test animals employed in the toxicity tests were larvae of the sea lamprey, *Petromyzon marinus*, and fingerlings of about four inches in length of rainbow trout, Salmo gairdnerii, and brown trout, Salmo trutta, which are representative of the desirable game fish. Individuals of each of the three species were used for each concentration tested. The vessels employed for testing were eight liter glass battery jars containing five liters of water. They were provided with standard stone air-breakers and were maintained at a constant temperature by immersion in a constant temperature trough. The amount of chemical to provide the desired concentration is calculated, weighed out, dissolved in a suitable solvent previously determined to be non-toxic under the condition of use, such as acetone, and introduced into the test vessel. The test period runs for twenty-four hours and approximately six observations are taken and recorded for each individual test during this period.

The following tables summarize the results obtained using various concentrations of (a) 2,5-dichloro-4-nitrophenol; (b) 3,4,6-trichloro-2-nitrophenol; (c) 2-bromo-4-nitrophenol; (d) 3-bromo-4-nitrophenol; (e) 5-chloro-2-nitrophenol; (f) 3-trifluormethyl-4-nitrophenol; (g) sodium salt of 2,5-dichloro-4-nitrophenol; and (h) the sodium salt of 3,4,6-trichloro-2-nitrophenol.

*Table 1.—Toxicity of 2,5-dichloro-4-nitrophenol to larvae of the sea lamprey* (Petromyzon marinus) *and to rainbow trout* (Salmo gairdnerii) *and brown trout* (Salmo trutta)

[Tests at indicated concentrations were conducted for a 24-hour period at a water temperature of 55 deg. F.]

| Concentration in parts per million | Number of tests | Larval lampreys | | Rainbow trout | | Brown trout | |
|---|---|---|---|---|---|---|---|
| | | Number of test animals | Mortality (percentage of total test animals) | Number of test animals | Mortality (percentage of total test animals) | Number of test animals | Mortality (percentage of total test animals) |
| 1 | 24 | 48 | 0.0 | 48 | 0.0 | 48 | 0.0 |
| 2 | 24 | 48 | 67.2 | 48 | 0.0 | 48 | 0.0 |
| 3 | 24 | 48 | 100.0 | 48 | 0.0 | 48 | 0.0 |
| 5 | 23 | 46 | 100.0 | 46 | 2.2 | 46 | 0.0 |
| 7 | 24 | 48 | 100.0 | 48 | 0.0 | 48 | 21.0 |
| 9 | 24 | 48 | 100.0 | 48 | 6.3 | 48 | 35.7 |
| 11 | 24 | 48 | 100.0 | 48 | 6.3 | 48 | 39.9 |
| 13 | 24 | 48 | 100.0 | 48 | 25.0 | 48 | 77.1 |
| 15 | 24 | 48 | 100.0 | 48 | 85.4 | | |
| Totals | 215 | 430 | | 430 | | 382 | |

*Table 2.—Toxicity of 3,4,6-trichloro-2-nitrophenol to larvae of the sea lamprey* (Petromyzon marinus) *and to rainbow trout* (Salmo gairdnerii) *and brown trout* (Salmo trutta)

[Tests at indicated concentrations were conducted for a 24-hour period at a water temperature of 55 deg. F.]

| Concentration in parts per million | Number of tests | Larval lampreys | | Rainbow trout | | Brown trout | |
|---|---|---|---|---|---|---|---|
| | | Number of test animals | Mortality (percentage of total test animals) | Number of test animals | Mortality (percentage of total test animals) | Number of test animals | Mortality (percentage of total test animals) |
| 3 | 24 | 48 | 0.0 | 48 | 0.0 | 48 | 0.0 |
| 5 | 24 | 48 | 93.7 | 48 | 0.0 | 48 | 0.0 |
| 6 | 24 | 48 | 100.0 | 48 | 0.0 | 48 | 0.0 |
| 7 | 24 | 48 | 100.0 | 48 | 0.0 | 48 | 2.1 |
| 9 | 24 | 48 | 100.0 | 48 | 2.1 | 48 | 6.3 |
| 11 | 24 | 48 | 100.0 | 48 | 6.3 | 48 | 10.5 |
| 13 | 24 | 48 | 100.0 | 48 | 2.1 | 48 | 10.5 |
| 15 | 24 | 48 | 100.0 | 48 | 14.7 | 48 | 33.6 |
| 17 | 24 | 48 | 100.0 | 48 | 50.0 | 48 | 70.8 |
| Totals | 216 | 432 | | 432 | | 432 | |

*Table 3.—Toxicity of 2-bromo-4-nitrophenol to larvae of the sea lamprey* (Petromyzon marinus) *and to rainbow trout* (Salmo gairdnerii) *and brown trout* (Salmo trutta)

[Tests at indicated concentrations were conducted for a 24-hour period at a water temperature of 55 deg. F.]

| Concentration in parts per million | Number of tests | Larval lampreys | | Rainbow trout | | Brown trout | |
|---|---|---|---|---|---|---|---|
| | | Number of test animals | Mortality (percentage of total test animals) | Number of test animals | Mortality (percentage of total test animals) | Number of test animals | Mortality (percentage of total test animals) |
| 1 | 24 | 48 | 0.0 | 48 | 0.0 | 48 | 0.0 |
| 2 | 24 | 48 | 2.1 | 48 | 0.0 | 48 | 0.0 |
| 3 | 24 | 48 | 27.3 | 48 | 0.0 | 48 | 0.0 |
| 4 | 24 | 48 | 66.6 | 48 | 0.0 | 48 | 2.1 |
| 5 | 24 | 48 | 100.0 | 48 | 0.0 | 48 | 4.2 |
| 7 | 24 | 48 | 100.0 | 48 | 4.2 | 48 | 2.1 |
| 9 | 24 | 48 | 100.0 | 48 | 6.3 | 48 | 21.0 |
| 11 | 24 | 48 | 100.0 | 48 | 2.1 | 48 | 44.1 |
| 13 | 24 | 48 | 100.0 | 48 | 52.5 | 48 | 50.4 |
| 15 | 24 | 48 | 100.0 | 48 | 52.5 | | |
| Totals | 240 | 480 | | 480 | | 480 | |

Table 4.—Toxicity of 3-bromo-4-nitrophenol to larvae of the sea lamprey (Petromyzon marinus) and to rainbow trout (Salmo gairdnerii) and bluegill sunfish (Lepomis machrochirus)

[at indicated concentrations were conducted for a 24-hour period at a water temperature of 55 deg. F.]

| Concentration in parts per million | Number of tests | Larval lampreys | | Rainbow trout | | Bluegill sunfish | |
|---|---|---|---|---|---|---|---|
| | | Number of test animals | Mortality (percentage of total test animals) | Number of test animals | Mortality (percentage of total test animals) | Number of test animals | Mortality (percentage of total test animals) |
| 1 | 35 | 70 | 0.0 | 70 | 0.0 | 70 | 0.0 |
| 3 | 48 | 96 | 71.8 | 96 | 0.0 | 96 | 0.0 |
| 5 | 147 | 294 | 99.7 | 292 | 2.4 | 292 | 1.4 |
| 7 | 69 | 138 | 100.0 | 138 | 1.5 | 90 | 2.2 |
| 9 | 48 | 96 | 100.0 | 96 | 7.3 | 69 | 4.3 |
| 11 | 36 | 72 | 100.0 | 72 | 18.0 | 72 | 1.4 |
| 13 | 48 | 96 | 100.0 | 96 | 55.0 | 96 | 4.3 |
| 15 | 18 | 36 | 100.0 | 36 | 94.4 | 36 | 53.0 |
| 17 | 18 | 36 | 100.0 | 36 | 97.1 | 36 | 80.5 |
| Totals | 467 | 934 | | 932 | | 857 | |

Table 5.—Toxicity of 5-chloro-2-nitrophenol to larvae of the seal lamprey (Petromyzon marinus) and to rainbow trout (Salmo gairdnerii) and brown trout (Salmo trutta)

[Tests at indicated concentrations were conducted for a 24-hour period at a water temperature of 55 deg. F.]

| Concentration in parts per million | Number of tests | Larval lampreys | | Rainbow trout | | Brown trout | |
|---|---|---|---|---|---|---|---|
| | | Number of test animals | Mortality (percentage of total test animals) | Number of test animals | Mortality (percentage of total test animals) | Number of test animals | Mortality (percentage of total test animals) |
| 1 | 12 | 24 | 3.9 | 24 | 0.0 | 24 | 0.0 |
| 3 | 24 | 48 | 100.0 | 48 | 2.1 | 48 | 4.1 |
| 5 | 24 | 48 | 100.0 | 48 | 16.4 | 48 | 64.6 |
| Totals | 60 | 120 | | 120 | | 120 | |

Table 6.—Toxicity of 3-trifluormethyl-4-nitrophenol to larvae of the sea lamprey (Petromyzon marinus) and to rainbow trout (Salmo gairdnerii) and brown trout (Salmo trutta)

[Tests at indicated concentrations were conducted for a 24-hour period at a water temperature of 55 deg. F.]

| Concentration in parts per million | Number of tests | Larval lampreys | | Rainbow trout | | Brown trout | |
|---|---|---|---|---|---|---|---|
| | | Number of test animals | Mortality (percentage of total test animals) | Number of test animals | Mortality (percentage of total test animals) | Number of test animals | Mortality (percentage of total test animals) |
| 1 | 24 | 48 | 37.8 | 48 | 0.0 | 48 | 0.0 |
| 2 | 24 | 48 | 100.0 | 48 | 0.0 | 48 | 0.0 |
| 3 | 24 | 48 | 100.0 | 48 | 0.0 | 48 | 0.0 |
| 5 | 24 | 48 | 100.0 | 48 | 2.1 | 48 | 6.3 |
| 7 | 24 | 48 | 100.0 | 48 | 6.3 | 48 | 25.0 |
| 9 | 24 | 48 | 100.0 | 48 | 27.1 | 48 | 69.3 |
| 11 | 24 | 48 | 100.0 | 48 | 90.3 | 48 | 100.0 |
| Totals | 168 | 336 | | 336 | | 336 | |

*Table 7.—Toxicity of the sodium salt of 2,5-dichloro-4-nitrophenol to larvae of the sea lamprey* (Petromyzon marinus) *and to rainbow trout* (Salmo gairdnerii)

[Tests at indicated concentrations were conducted for a 24-hour period at a water temperature of 55 deg. F.]

| Concentration in parts per million | Number of tests | Larval lampreys | | Rainbow trout | |
|---|---|---|---|---|---|
| | | Number of test animals | Mortality (percentage of total test animals) | Number of test animals | Mortality (percentage of total test animals) |
| 1.0 | 12 | 24 | 0.0 | 24 | 0.0 |
| 3.0 | 12 | 24 | 20.8 | 24 | 0.0 |
| 4.0 | 12 | 24 | 70.8 | 24 | 0.0 |
| 5.0 | 12 | 24 | 100.0 | 24 | 0.0 |
| 10.0 | 12 | 24 | 100.0 | 24 | 0.0 |
| 13.0 | 36 | 72 | 100.0 | 72 | 19.4 |
| 15.0 | 12 | 24 | 100.0 | 24 | 16.6 |
| 17.0 | 12 | 24 | 100.0 | 24 | 20.8 |
| 19.0 | 12 | 24 | 100.0 | 24 | 45.8 |
| Totals | 132 | 264 | | 264 | |

*Table 8.—Toxicity of the sodium salt of 3,4,6-trichloro-2-nitrophenol to larvae of the sea lamprey* (Petromyzon marinus) *and to rainbow trout* (Salmo gairdnerii)

[Tests at indicated concentrations were conducted for a 24-hour period at a water temperature of 55 deg. F.]

| Concentration in parts per million | Number of tests | Larval lampreys | | Rainbow trout | |
|---|---|---|---|---|---|
| | | Number of test animals | Mortality (percentage of total test animals) | Number of test animals | Mortality (percentage of total test animals) |
| 5.0 | 12 | 24 | 0.0 | 24 | 0.0 |
| 10.0 | 12 | 24 | 46.2 | 24 | 0.0 |
| 13.0 | 12 | 24 | 100.0 | 24 | 8.4 |
| 15.0 | 12 | 24 | 100.0 | 24 | 8.4 |
| 17.0 | 12 | 24 | 100.0 | 24 | 0.0 |
| 19.0 | 12 | 24 | 100.0 | 24 | 8.4 |
| 21.0 | 12 | 24 | 100.0 | 24 | 8.4 |
| 23.0 | 12 | 24 | 100.0 | 24 | 62.5 |
| 25.0 | 12 | 24 | 100.0 | 24 | 54.2 |
| Totals | 108 | 216 | | 216 | |

In these tables mortalities of the host fish at or below 10% are not considered significant since such mortalities have been demonstrated to occur even in test controls as a result of handling specimens, diseased individuals, etc.

It is seen from Table 1 that 100% of the lamprey larvae are killed at a concentration of three parts per million of 2,5-dichloro-4-nitrophenol, and that no significant mortality of rainbow trout takes place until the concentration exceeds 11 parts per million. This differential is more than ample to permit the successful treatment of infected streams. In fact, the spread is so big that treatment of rather large rivers will be greatly facilitated by use of this compound.

With brown trout, an appreciable mortality takes place when the concentration of 2,5-dichloro-4-nitrophenol exceeds 5 parts per million. The greater susceptibility of brown trout to 2,5-dichloro-4-nitrophenol does not preclude the treatment of larger streams with the substance since that species does not inhabit the majority of the larger and more heavily infested watersheds. Rainbow trout are usually the principal game fish species in these streams. Where conditions admit of close control, it may be employed in smaller streams inhabited by brown trout.

In the case of 3,4,6-trichloro-2-nitrophenol (Table 2), it will be observed that 100 percent of the lamprey larvae are killed at a concentration of 6 parts per million, and that there is no significant mortality of either rainbow trout or brown trout below 13 parts per million. This differential of 7+ parts per million is ample to permit successful treatment of infested streams. In view of the low toxicity of this compound toward brown trout, it may be used in infested streams of all sizes, regardless of the trout species present. It must also be noted that the larvae kill is 93.7 percent at 5 parts per million concentration, so that even at this lower concentration, a significant reduction in lamprey population can be achieved.

Table 3 gives the results achieved with 2-bromo-4-nitrophenol. It will be seen that 100 percent mortality of lamprey larvae occurs at a concentration of 5 parts per million. No significant mortality of rainbow or brown trout occurs until the concentration exceeds 11 parts per million and 9 parts per million respectively for the two species. These differentials of 6+ parts per million for rainbow trout and 4+ parts for brown trout permit successful treatment of streams infested with lamprey larvae.

Table 4 gives the results achieved with 3-bromo-4-nitrophenol. In this run the bluegill sunfish (*Lepomis machrochirus*) was substituted for brown trout as one of the species tested. It will be noted that 99.7 percent of the lamprey larvae are killed at 5 parts per million concentration and that no appreciable mortality of rainbow trout occurs until the concentration exceeds 9 parts per million, and in the case of the bluegill sunfish, until the concentration exceeds 13 parts per million. The spread of 4+ parts per million is sufficient for useful application of this compound to control the lamprey in streams inhabited by rainbow trout. The spread of 8+ parts per million in the case of the bluegill sunfish renders this compound very valuable for the treatment of streams which have large sunfish and other warm water fish populations but contain no trout.

Table 5 shows the results achieved with 5-chloro-2-nitrophenol. A 100 percent mortality of lamprey larvae is attained at 3 parts per million and an appreciable mortality of rainbow and brown trout occurs at a concentration of 5 parts per million. This compound can be used where conditions admit of close control.

Table 6 shows the results achieved with 3-trifluoromethyl-4-nitrophenol. A 100 percent kill of larvae is attained at a concentration of 2 parts per million. Between 7 and 9 parts per million a significant kill of rainbow trout occurs, and this point is reached with brown trout at a concentration of between 5 and 7 parts per million. The spread is sufficient for treatment of the larger and more heavily infested streams.

Table 7 shows the results achieved with the sodium salt of 2,5-dichloro-4-nitrophenol. A 100 percent kill of larvae is attained at a concentration of 5.0 parts per million. Between 10 and 13.0 parts per million a significant kill of rainbow trout occurs. This spread of between 5 and 8 parts per million permits effective use of this compound.

Table 8 shows that a 100 percent larvae kill is attained at 13.0 parts per million using the sodium salt of 3,4,6-trichloro-2-nitrophenol. With the same compound a significant kill of rainbow trout occurs between 21.0 and 23.0 parts per million. This compound therefore is suitable for use in controlling the sea lamprey.

These tables show that lamprey larvae are more susceptible to the halogenated nitrophenols and their alkali metal salts than are game fish, and that suitable concentrations of the compounds may be selected whereby the desirable fish species are relatively unaffected while the larvae are selectively poisoned. In the case of compounds showing a relatively narrow differential, closer control is necessary than for compounds having a greater differential. In the field such compounds would ordinarily be used in smaller streams.

The concentration of halogenated nitrophenolic compounds employed, under certain circumstances, may be greater than that which would produce about a ten percent mortality of game fishes. The objective of eradicating lamprey could warrant a much higher game fish mortality, for example, twenty-five percent, where the larvae infestation is particularly severe, the stream is isolated, and the amount of sport fishing limited. Of course, the heavy dosage of poison would not be repeated until the game fish population had recovered.

In combatting the lamprey according to our invention, it is desirable that the halogenated nitrophenolic compound be added to the stream and/or its tributaries sufficiently above the known habitats of the larvae. Thereby the concentration of the poison will be relatively uniform over the quiet waters covering the mudflats in which the larvae burrow. The material flow of the water aids in dispersing and mixing the chemical, lessening the amount of labor necessary.

The compound may be dissolved in either water or other non-toxic solvent miscible with water to make a concentrated solution and introduced into the stream by a suitable metering device to maintain the desired concentration over the stream bottom area to be treated for about twenty-four hours.

The efficiency of the treatment and dosage may be gauged by placing screen cages containing lamprey larvae and game fish fingerlings in the stream during the exposure. The effect on the individuals indicate whether the concentration in the stream is adequate for the purpose.

We claim:

1. A method for controlling the larvae of the seal lamprey, *Petromyzon marinus*, which comprises establishing a concentration a concentration of from about 5 parts to about 12 parts per million of 2-bromo-4-nitrophenol in the water over and in contact with stream bottoms containing said larvae.

2. The method for controlling *Petromyzon marinus* comprising contacting *Petromyzon marinus* in their larval stage with 3-bromo-4-nitrophenol.

3. A process for the destruction of *Petromyzon marinus* in the larval stage which comprises contacting the same with a lethal concentration of 3-bromo-4-nitrophenol in an aqueous medium.

4. A method for controlling the larvae of the sea lamprey, *Petromyzon marinus*, which comprises establishing a concentration of from about 3 parts to about 12 parts per million of 3-bromo-4-nitrophenol in the water over and in contact with mud bottoms containing said larvae.

5. A method for killing larvae of the sea lamprey, *Petromyzon marinus*, living in a stream bottom, which comprises, releasing in the water over and in contact with said stream bottom, a concentrated solution of 2-bromo-4-nitrophenol, the solvent being water miscible and non-toxic, and maintaining a lethal concentration of said nitrophenol in the water.

6. A method for killing larvae of the sea lamprey, *Petromyzon marinus*, living in a stream bottom, which comprises, releasing in the water over and in contact with said stream bottom, a concentrated solution of 3-bromo-4-nitrophenol, the solvent being water miscible and non-toxic, and maintaining a lethal concentration of said nitrophenol in the water.

References Cited by the Examiner

UNITED STATES PATENTS

| | | | |
|---|---|---|---|
| 2,850,537 | 9/1958 | Stoesser | 167—13 |
| 3,052,601 | 9/1962 | Pyne | 167—46 |
| 3,157,571 | 11/1964 | Scherer et al. | 167—31 |

OTHER REFERENCES

Bellack et al.: Relationship Between Chemical Structure and Toxic Action on Rats, page 21, May 8, 1952.

Chemical Week, Dec. 17, 1955, pp. 59–60.

Chem. Abstracts, vol. 33 (1939), page 3663.

Dewitt et al.: "Relationship Between Chemical Structure and Toxic Action on Rats," Chem.-Biol. Coordination Center, Review No. 5, National Res. Council, Washington, D.C., May 8, 1954, pp. 1–6 and 21.

King: "Chemicals Evaluated as Insecticides," U.S. Dept. of Agri. Handbook No. 69, pp. 1–6 and 260, May 1954.

King: Chemicals Evaluated as Insecticides, page 260, May 1954.

JULIAN S. LEVITT, *Primary Examiner.*

MORRIS O. WOLK, LEWIS GOTTS, *Examiners.*